(12) United States Patent
Bamberg et al.

(10) Patent No.: US 10,343,340 B2
(45) Date of Patent: Jul. 9, 2019

(54) MEDICAL PACKAGING MATERIAL, IN PARTICULAR PHARMACEUTICAL PACKAGING MATERIAL AS WELL AS METHODS OF JOINING PLASTIC COMPONENTS OF MEDICAL PACKAGING MATERIALS

(71) Applicant: Schott Schweiz AG, St. Gallen (CH)

(72) Inventors: Klaus Bamberg, Zuzwil SG (CH); Mustafa Kücük, Staad (CH)

(73) Assignee: Schott Schweiz AG, St. Gallen (CH)

( * ) Notice: Subject to any disclaimer, the term of this patent is extended or adjusted under 35 U.S.C. 154(b) by 177 days.

(21) Appl. No.: 15/264,818

(22) Filed: Sep. 14, 2016

(65) Prior Publication Data
US 2017/0072621 A1 Mar. 16, 2017

(30) Foreign Application Priority Data

Sep. 15, 2015 (DE) .................. 10 2015 217 635
Jul. 26, 2016 (DE) .................. 10 2016 213624
Jul. 26, 2016 (EP) ...................... 16181123

(51) Int. Cl.
| | | |
|---|---|---|
| B32B 27/08 | (2006.01) |
| B23B 27/20 | (2006.01) |
| A61J 1/10 | (2006.01) |
| B29C 65/16 | (2006.01) |
| B32B 27/20 | (2006.01) |
| B29C 65/00 | (2006.01) |
| B29K 101/12 | (2006.01) |
| B29K 105/16 | (2006.01) |
| B29L 31/00 | (2006.01) |

(52) U.S. Cl.
CPC ............ *B29C 65/1612* (2013.01); *A61J 1/10* (2013.01); *B29C 65/168* (2013.01); *B29C 65/1635* (2013.01); *B29C 65/1683* (2013.01); *B29C 66/1142* (2013.01); *B32B 27/08* (2013.01); *B32B 27/20* (2013.01); *B29C 65/1616* (2013.01); *B29C 65/1677* (2013.01); *B29C 66/1122* (2013.01); *B29C 66/43* (2013.01); *B29C 66/712* (2013.01); *B29C 66/919* (2013.01); *B29C 66/949* (2013.01); *B29K 2101/12* (2013.01); *B29K 2105/16* (2013.01); *B29K 2995/0018* (2013.01); *B29L 2031/712* (2013.01); *B29L 2031/7148* (2013.01); *B32B 2307/40* (2013.01); *B32B 2439/80* (2013.01)

(58) Field of Classification Search
None
See application file for complete search history.

(56) References Cited

U.S. PATENT DOCUMENTS

| | | |
|---|---|---|
| 2004/0030384 A1 | 2/2004 | Wissman |
| 2004/0089640 A1 | 5/2004 | Bager et al. |
| 2005/0224472 A1 | 10/2005 | Rasmussen et al. |
| 2008/0145682 A1* | 6/2008 | Rasmussen ............ B23K 26/18 428/523 |
| 2010/0185171 A1 | 7/2010 | Muramatsu et al. |

FOREIGN PATENT DOCUMENTS

| | | |
|---|---|---|
| DE | 100 03 423 A1 | 8/2001 |
| JP | 2009-39872 A | 2/2009 |
| WO | 2005100000 A1 | 10/2005 |

OTHER PUBLICATIONS

Dipl.ing. (FH) Frauke Legewie & Dipl.-ING. Nikolaus Fecht, "Simultaneously . . . in a Single Shot", Joining Large-Area and Transparent Components, Kunstoffe international Jun. 7, 2015, pp. 34-37 (4 pages).
European Search Report dated Feb. 9, 2017 for European Patent Application No. 16 18 1123 (6 pages).

\* cited by examiner

*Primary Examiner* — Sheeba Ahmed
(74) *Attorney, Agent, or Firm* — Taylor IP, P.C.

(57) ABSTRACT

A medical packaging material, in particular a pharmaceutical packaging material, comprising a first thermoplastic plastic component body consisting of a first material, a second thermoplastic plastic component body consisting of a second material, wherein between the first plastic component body and the second plastic component body at least one internal interface having a scattering effect is arranged that results preferably in an extended wavelength of radiated light.

11 Claims, 5 Drawing Sheets

PRIOR ART

MEDICAL PACKAGING MATERIAL, IN PARTICULAR PHARMACEUTICAL PACKAGING MATERIAL AS WELL AS METHODS OF JOINING PLASTIC COMPONENTS OF MEDICAL PACKAGING MATERIALS

BACKGROUND OF THE INVENTION

1. Field of the Invention

The invention relates to a medical packaging material, in particular a pharmaceutical packaging material. The invention moreover relates to a method for joining of plastic components of medical packaging materials with the assistance of laser welding.

2. Description of the Related Art

It is known for thermoplastic plastics that two components can be joined with the assistance of laser welding. This is due to the fact that thermoplastic plastics have a melting phase. Thermoplastic plastics are fused through laser radiation. During cooling, the plastics combine and are fused together. Because of the low absorption of laser radiation in most thermoplastic plastics, it is however necessary that the absorption capacity of the thermoplastic plastics is improved through the addition of additives, for example color pigments or carbon black. Plastic welding with a laser by way of transmission welding whereby one or two types of thermoplastic plastics are joined with each other is known. One bonding partner is a laser-transparent plastic and another bonding partner is an absorbent plastic. With such a welding method the laser beam penetrates the upper laser-transparent base material and impinges upon the absorbent plastic below same. The laser melts the surface of the absorbent plastic. Due to the heat input, the transparent bonding partner also melts. This leads to an overlap weld. The advantage of overlap welding consists in that the welding seam in the interior of the component forms without release of any particles. A great advantage of laser welding is the local heat input.

A laser welding process for plastic materials that includes an absorber pigment and/or a scatter pigment has become known from WO 2005/100 000 A1. An infrared absorber and/or $TiO_2$ in a concentration to 10 weight-% is described as an absorber and/or scatter pigment in WO 2005/100 000 A1. Polyethylene, preferably LDPE is utilized as plastic material. The $TiO_2$ particles in WO 2005/100 000 A1 are scatter particles that lead to an increase of the optical path length, and via the increased optical path length to greater absorption effect. WO 2005/100 000 A1 features a laser welding process and a product that is produced in a laser welding process, however no medical packaging material, in particular no pharmaceutical packaging suitable for the high demand in regard to approval. The method according to WO 2005/100 000 A1 is also not practicable for medical packaging materials due to the absorber and/or scatter pigments.

US 2005/0224472 A1 also illustrates a laser welding process, wherein absorber and scatter pigments are utilized. These are $TIO_2$ particles having an average particle size of 300 nm. Medical packaging materials are also not addressed in US 2005/0224472 A1.

DE 100 03 423 A1 describes a laser welding method wherein laser pigments that absorb the laser radiation are used, which leads to heating and fusing of the components that are to be joined. A medical packaging material is also not cited in DE 100 03 423 A1.

With the methods according to the state of the art, it was disadvantageous that an additive that absorbs the laser beam and partially produces heat had to be added to at least one of the plastic components that are welded with the laser.

Only certain plastics are approved for pharmaceutical packaging that generally do not contain such additives. However, through the addition of such additives the approval for the plastic to be used in pharmaceutical packaging is terminated, since the original formulation is changed, so that such a welding process generally is not considered in the field of pharmaceutical products. With medical packaging materials the use of absorber and/or scatter pigments is not possible.

Other welding methods such as ultra-welding, vibration welding, high frequency welding, and heated tool welding are inapplicable as the laser welding method for plastics in the field of medical technology, because they are associated with expensive cleaning procedures. Thus, contaminations have to be removed subsequent to welding.

It is therefore the objective of the current invention to cite a medical packaging material, in particular a pharmaceutical packaging that avoids the disadvantages of the current state of the art. In particular, a medical packaging material is to be cited whereby partial bodies are bonded through laser welding without absorber and/or scatter pigments.

SUMMARY OF THE INVENTION

The present invention provides a medical packaging material, in particular a pharmaceutical packaging material whereby between a first thermoplastic plastic component body and a second thermoplastic plastic component body at least one internal interface having a scattering effect is arranged. In an especially preferred embodiment it is provided that the medical packaging material includes several internal interfaces. It is especially preferred if the internal interface with scattering effect is formed by the first material of the first thermoplastic plastic component and/or the second material of the second thermoplastic plastic component. It is preferred if the internal interface with scattering effect comprises a connecting body. It is especially preferred if the material for the first plastic component body is the same as the material for the second plastic component body; in other words, the first plastic component body and the second plastic component body consist of the same material. The connecting body is preferably in the embodiment of a pressed connecting body that preferably includes ground plastic granules with grain boundaries. The connecting body is free of additional absorber particles and/or absorber pigments and/or scatter particles and/or scatter pigments such as, for example $TiO_2$-particles. The material of the connecting body is preferably the same material as the material of the first and/or the second thermoplastic plastic component. When used in the field of medicinal products new approval is not required, since only certified materials are used.

Due to its structure with grain boundaries that are also formed through compression of polymer powder, the material of the connecting body leads to reflection and scattering of the radiated laser light, so that a laser absorption that is necessary for welding can occur analogously to the laser absorption with additives, simply through the reflection and scattering; in other words, the extension of the path length of the radiated light. Due to the reflection and scattering of the laser light in, or respectively at the interface, the plastic component is fused and bonds then with the two other bonding partners, namely the first plastic component body and the second plastic component body. An absorption pigment and/or a scatter pigment are not necessary in such a structure.

When used in the pharmaceutical field it is advantageous if the connecting body consists of the same material as the material for the first and/or second plastic component body. The inventive medical packaging materials consist of at least two plastic component bodies that can be joined with one another with the assistance of at least one internal interface with the assistance of scatter effect. The medical packaging materials are in particular such that accommodate substances, for example hyaluronic acid, anesthetics or neuroleptics.

In addition to the medical packaging material, in particular the pharmaceutical packaging material, the invention also provides a method to bond one first plastic component body and a second plastic component body into one plastic component with at least one interface arranged between the first plastic component body and the second plastic component body. The internal interface with scatter effect is especially preferably provided by way of a connecting body. In the method, a laser beam with at least one wavelength is directed onto the interface in such a way that the temperature increase required for welding of the first plastic component body and the second plastic component body occurs due to reflection and scattering at the interface or in the interface.

Due to the refraction at, or respectively in the interface, or respectively due to reflection and scattering at the interface the same increases in temperature and is fused, so that the first plastic component body bonds or in other words joins with the second plastic component body. In this manner, the first and second plastic component body are joined with one another. The wavelength of the laser is selected especially preferably to be between 800 and 1500 nm, preferably 800 and 1200 nm. For joining the first and second plastic component body, neither an absorber nor a scatter pigment are necessary with the design according to the invention.

Sufficient heating of the interface, in particular of the connecting body is achieved if the laser acts upon the interface, in particular the connecting body for a certain period of time with an output of 100 to 600 W, preferably 100 to 300 W, or even 600 W or higher. The exposure times are contingent upon the plastic material, the absorption coefficient, the wall thickness and the size of the component. In order to join the two plastic parts with one another, the first and second plastic part bodies are placed against each other. The time period over which the laser acts upon the interface, in particular the connecting body depends on the melting point of the plastic material, the wall thickness, the size of the component, the geometry and absorption coefficient of the plastic material. The exposure time is a few seconds, preferably 0.1 to 100 seconds, in particular 5 to 60 seconds. The laser beam operates selectively. The material is heated point to point, as soon as fusing has occurred. If fusing occurs point to point only the laser and/or the component are moved along; that is, to the next welding location. The complete welding process is contingent upon the size of the component.

With the inventive method the components that are to be joined with one another do not have to be braced or pressed. Bracing or pressing would even be counter-productive since with the bracing/pressing process, tensions are introduced into the component or the fused connecting body, or the fused connecting component would form a bulge, which should be avoided. The components are either protected in a device against movement or are only placed next to one another.

Several possibilities are conceivable for the production of a connecting body that provides the internal interface. The first option of producing the connecting body is pressing of micro-granulate. With this method, micro-granulate having a size of ≥400 μm is pressed under pressure. Depending on the material, the applied pressures are between 15 and 100 kN/cm$^3$. According to the material, the pressed part can in addition be heat treated in order to increase the bonding strength. The temperatures are material dependent and with semi-crystalline materials, for example PE, PP, PA or PET are above the crystallite melting temperature; with amorphous materials, for example PC, COC, COP or PMMA above the glass transition temperature.

As an alternative to a micro-granulate, plastic powder can also be pressed. In this case, plastic powder in a size of ≥10 μm is pressed. The material dependent pressures are around 15-100 kN/m$^3$. According to the material, the pressed part can in addition be heat treated in order to increase the bonding strength. The temperatures are material dependent and with semi-crystalline materials, for example PE, PP, PA or PET are above the crystallite melting temperature, with amorphous materials, for example PC, COC, COP or PMMA above the glass transition temperature. The duration is contingent on the component size and the wall thickness of the body and is in the seconds range.

An alternative embodiment for the production of a connecting body is injection molding with physical foaming. For this purpose, an inert gas, usually $CO_2$ or $N_2$ is added to the molten mass during the injection molding process, so that a foam structure forms. Through the foam structure of the welded body the laser beam can be absorbed at the interfaces, leading to a fusing of the welded body or welded component.

Another alternative embodiment of a production method is the component manufacture of the connecting body from micro droplets. If this method is used, the component is composed of micro droplets of the thermoplastic plastic. This ensures that also transparent plastics lose their transparency through the interfaces of the droplets and the laser beam is thus absorbed, leading to fusing of the connecting body or connecting component.

Yet another embodiment of a method for producing the connecting body is injection molding at a reduced mass temperature. By way of injection molding of the connecting body at a reduced mass temperature, some of the granules are not completely fused, so that thereby the transparency is impaired and the laser beam is absorbed at the interfaces, resulting in fusing of the connecting body.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrates embodiments of the invention and such exemplifications are not to be construed as limiting the scope of the invention in any manner.

DETAILED DESCRIPTION OF THE INVENTION

Figure 1:
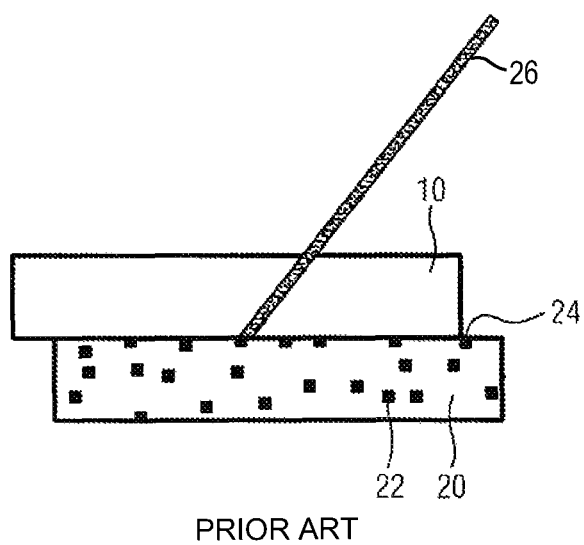
FIG. 1 illustrates a prior art method for laser welding of plastic.

FIG. 1 illustrates a plastic laser welding process as known from the current state of the art. A first plastic component body 10 consists of a laser-transparent material, that is a plastic material that transmits the laser light in the radiated wave length range extensively to 100%. Laser light 26 transmitted through first plastic component body 10 impinges on second absorbing plastic component body 20. Second absorbing plastic component body 20 includes an additive 22 that absorbs and/or scatters the radiated laser radiation 26, for example $TiO_2$ particles, causing heating of the second plastic component body, so that it melts on its surface 24. As a result of this, first plastic component body 10 and second plastic component body 20 are fused with each other. The wavelength of laser beam 26 is preferably between 800 nm and 1100 nm.

Figure 2A:
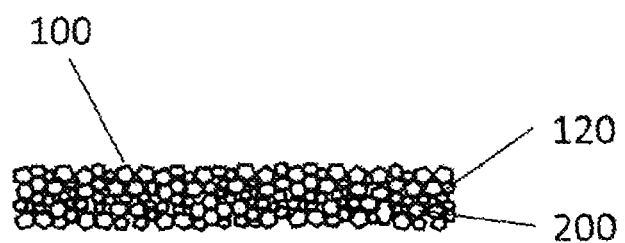
FIGS. 2a, 2b and 2c are top views of different embodiments of pressed connecting bodies according to the present invention.
Figure 2B:
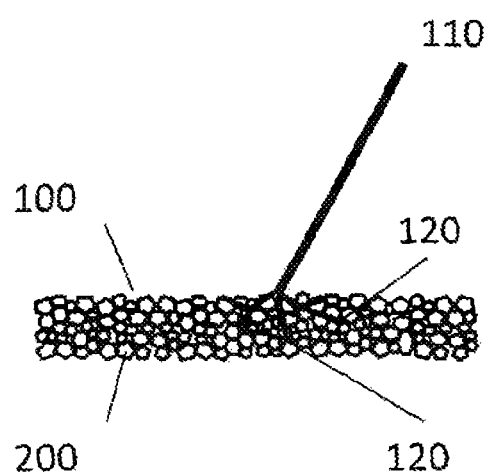
Figure 2C:
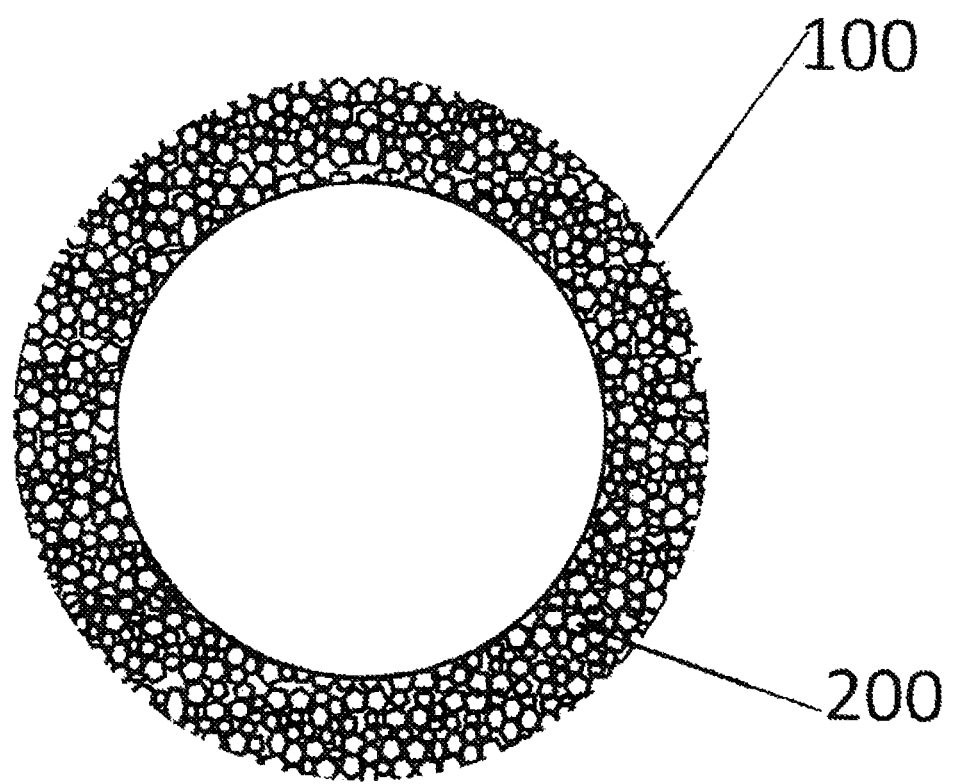

FIGS. 2a, 2b and 2c illustrate embodiments of the invention wherein the internal interfaces are provided with scattering effect through a separate connecting body 100. The connecting body is then inserted between the plastic component bodies that are to be joined. It would of course also be possible that the interface is provided on each plastic component body itself.

FIG. 2a illustrates the fundamental view of a connecting body 100 that provides an interface 120 as can be utilized for example according to the invention. The connecting body is predominantly a compressed sintered body consisting of ground plastic particles 200 in a size of approximately 400 micrometers. FIG. 2a is a top view of such a connecting body 100. As previously described, the connecting body that provides an interface can also be produced in a different manner.

One possibility is pressing of plastic powder in a size of ≥10 μm. Another possibility is injection molding with simultaneous foaming or the component manufacture from microdroplets. One additional option is injection molding at a reduced mass temperature. In each case, the connecting body provides at least one interface, whereby a heat input is provided due to an extended wavelength through reflection and scattering of the radiated light, and not through absorption on foreign particles, as per the current state of the art. The connecting body is thus free of absorber and/or scatter pigments.

FIG. 2b illustrates the behavior of connecting body 100 during radiation of laser light 110. Laser light 110 is reflected and scattered at interfaces 120 of ground plastic particles 200. The reflection and scattering of light 110 results in a laser absorption at interfaces 120.

FIG. 2c illustrates a top view of an inventive connecting body 100 in a cylindrical structural shape. Same components as in FIGS. 2a and 2b are identified with same reference numbers.

Figure 3:
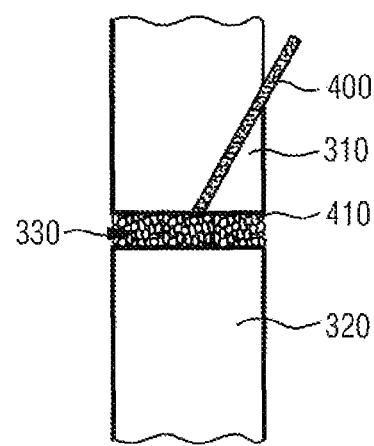
FIG. 3 illustrates a medical packaging material, in particular a pharmaceutical packaging material according to the invention.

FIG. 3 illustrates the connection of a first plastic component body 310 with a second plastic component body 320 to form a medical packaging material according to the invention. The connection of first plastic component body 310 and second plastic component body 320 occurs in the illustrated embodiment by way of a connecting body, as illustrated in the example in FIGS. 2a, 2b and 2c. The first plastic component body is a material that is transparent for the wavelength of laser beam 400. Light penetrating through first plastic component body 310 impinges on connecting body 100. Laser beam 400 is refracted in material 330 of connecting body 100 and due to the refraction and scattering of laser beams 410 inside the sintered material, connecting body 100 with its interfaces or the plastic sintered components are fused. Connecting body 100 thus joins the two bonding partners—namely first plastic component body 310 and second component part body 320. An absorber pigment and/or a scattering pigment is contained neither in second plastic component body 320 nor in first plastic component body 310, or in connecting body 100. Joining of first plastic component body and second plastic component body is provided without absorber and/or scatter pigments. The second plastic component body can be transparent like the first plastic component body. The material of the first plastic component body and the second plastic component body, as well as possibly of the connecting body are preferably identical. The wavelength of the radiated laser light is preferably within the range of 800 to 1500 mm, preferably 800 to 1200 nm.

The invention cites for the first time a medical packaging material, in particular a pharmaceutical packaging material that is free of absorber pigments and/or scatter pigments in a plastic component that is to be joined. The plastic component that is produced in this manner is excellently suitable for use in the manufacture of pharmaceutical products wherein a change in the composition of the plastic material that is used is not permissible.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A medical packaging material, comprising:
    a first thermoplastic plastic component body consisting of a first material; and
    a second thermoplastic plastic component body consisting of a second material;
    wherein at least one internal interface having a scattering effect is arranged between the first thermoplastic plastic component body and the second thermoplastic plastic component body, resulting in an extended optical path length of radiated light, the at least one internal interface comprising a connecting body that is free of $TiO_2$.

2. The medical packaging material according to claim 1, wherein the medical packaging material is a pharmaceutical packaging material.

3. The medical packaging material according to claim 1, wherein several internal interfaces are provided that offer a high scattering effect of the radiated light.

4. The medical packaging material according to claim 1, wherein the first material and the second material are identical.

5. The medical packaging material according to claim 1, wherein the at least one internal interface with the scattering effect is formed by at least one of the first material and the second material.

6. The medical packaging material according to claim 1, wherein the connecting body is a component selected from the group consisting of:

a pressed connecting body consisting of a micro-granulate having a particle size of ≥400 μm, the pressed connecting body consisting of polyethylene, polypropylene, polyamide, polyethylene terephthalate, polycarbonate, cyclic olefin copolymer, cyclic olefin polymer, or polymethyl methacrylate;

a pressed plastic welded component consisting of a plastic powder having a particle size of ≥10 μm, the plastic powder consisting of polyethylene, polypropylene, polyamide, polyethylene terephthalate, polycarbonate, cyclic olefin copolymer, cyclic olefin polymer, or polymethyl methacrylate;

a connecting body whereby an inert gas is added during injection molding;

a connecting body that is comprised of micro-droplets of a thermoplastic plastic; or a connecting body that is produced by injection molding at a reduced mass temperature.

7. The medical packaging material according to claim 1, wherein the connecting body consists of at least one of the first material and the second material.

8. The medical packaging material according to claim 1, wherein at least one of the at least one internal interface and the connecting body and the first thermoplastic plastic component body and the second thermoplastic plastic component body is free of at least one of absorber pigments and scatter pigments.

9. The medical packaging material according to claim 1, wherein the medical packaging material further comprises at least one of hyaluronic acid, anesthetics and neuroleptics.

10. The medical packaging material according to claim 1, wherein the at least one interface is free of absorber pigments and scatter pigments.

11. A medical packaging material, comprising:

a first thermoplastic plastic component body consisting of a first material; and a second thermoplastic plastic component body consisting of a second material;

wherein at least one internal interface having a scattering effect is arranged between the first thermoplastic plastic component body and the second thermoplastic plastic component body, resulting in an extended optical path length of radiated light, the at least one internal interface comprising a connecting body that is selected from the group consisting of:

a pressed connecting body consisting of a polymer micro-granulate having a particle size of ≥400 μm; and a pressed plastic welded component consisting of a plastic powder having a particle size of ≥10 μm.

* * * * *